United States Patent [19]

Shimizu

[11] Patent Number: 4,681,181

[45] Date of Patent: Jul. 21, 1987

[54] ELECTRIC POWER STEERING SYSTEM FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 887,304

[22] Filed: Jul. 23, 1986

[30] Foreign Application Priority Data

Aug. 6, 1985 [JP] Japan ................................. 60-173470

[51] Int. Cl.⁴ .............................................. B62D 5/04
[52] U.S. Cl. ................................................. 180/79.1
[58] Field of Search ....................... 180/79.1, 142, 143; 364/424

[56] References Cited

U.S. PATENT DOCUMENTS 4,458,795  7/1984  Norton ............................... 180/79.1

FOREIGN PATENT DOCUMENTS

2132950  7/1984  United Kingdom ............... 180/79.1

Primary Examiner—John A. Pekar
Attorney, Agent, or Firm—Armstrong, Nikaido, Marmelstein & Kubovcik

[57] ABSTRACT

An electric power steering system (60) for vehicles has an electromagnetic servo device (1) including a drive control circuit (30, 40) for feeding a drive signal (Va) to an electric motor (14) for producing auxiliary torque to be supplied to an output shaft (6) in accordance with a steering torque signal ($S_1$, $S_2$) from a steering torque detection mechanism (32) which detects steering torque (Ts) acting on an input shaft (5) and a vehicle speed signal ($S_5$) from a vehicle speed detection mechanism (50) which detects the speed (Vs) of the vehicle. The drive control circuit is adapted to determine, of the motor drive signal, a component (D(F)) corresponding to the load due to friction elements of the servo device and a component (D(L)) corresponding to the load from the road surface side, depending on the steering torque signal, and to determine a vehicle speed factor (K(V)), depending on the vehicle speed signal. The magnitude of the motor drive signal is determined as the sum of the frictional load component and a corrected road surface side load component (D'(L)) obtained by multiplying the road surface side load component by the vehicle speed factor. The drive control circuit includes a microcomputer unit (30) for determining the frictional load component and the road surface side load component in an address designation manner in dependence on the steering torque signal and the vehicle speed factor in an address designation manner in dependence on the vehicle speed signal.

10 Claims, 16 Drawing Figures

ELECTRIC POWER STEERING SYSTEM FOR VEHICLES

BACKGROUND OF THE INVENTION

1. Field of the Invention

The present invention relates to a power steering system for vehicles, and more particularly, to an electric power steering system for vehicles which produces auxiliary steering torque by means of a steering servo device using an electric motor.

2. Description of Relevant Art

In recent years, in view of problems in hydraulic type power steering systems such as that the structure thereof is complicated, a variety of electric type power steering systems for vehicles have been proposed.

As one of such electric power steering systems for vehicles, there is disclosed an example of an analogue control type in UK Patent Application Publication No. GB 2132950 A, published July 18, 1984.

The electric power steering system for vehicles according to this UK Publication includes an input shaft as a steering shaft connected to a steering wheel, an output shaft interconnected through a universal joint with the input shaft and through a rack and pinion type gear with a tie rod of steered wheels, an electric motor for supplying auxiliary torque through a reduction gear to the output shaft, a torque detecting mechanism disposed on the input shaft to detect steering torque acting on the input shaft, a motor drive circuit for driving the electric motor, and an analogue type control circuit for feeding the motor drive circuit with a control signal in accordance with a detection signal from the torque detecting mechanism.

The analogue type control circuit is adapted to have an armature voltage PWM-controlled to be impressed to the electric motor, with such a polarity that, during a steering operation in either direction of rotation of the steering wheel, causes the motor to rotate in a direction corresponding to the steering direction; there being fed back a signal corresponding to an armature current. Moreover, in the UK Publication, the electric motor is adapted to start only in a vehicle speed range not exceeding a predetermined value. To this point, there is given no particular description in the UK Publication. However, it is generally known that the magnitude of necessary force for steering operation is relatively large when the traveling speed of vehicle is low, and relatively small when the traveling speed is high. Accordingly, in view of such general knowledge, it is presumed that, in the UK Publication, the electric motor is driven only in the range not exceeding a predetermined vehicle speed.

In the UK Publication above, therefore, in such a manner of drive control as described, auxiliary torque is produced by the electric motor and supplied through the reduction gear to the output shaft so that it is contrived to render the steering force light.

However, not limiting to the case of the power steering system according to the UK Publication, in various electric power steering systems proposed in recent years, their steering servo devices have friction elements such as an electric motor and a reduction gear. Moreover, in the case of the system according to the UK Publication, as measures for control in the range not exceeding the predetermined vehicle speed, the armature voltage to be impressed to the electric motor in accordance with steering torque is given as a function of the load from the road surface side only. Therefore, under such a condition that an operation of the steering wheel from its neutral position to the left or right is started at a low speed with a relatively small steering force, the armature voltage becomes small and there appears a steering torque region in which no auxiliary torque that corresponds to the steering load due to friction elements of the system is produced. In such torque region, it is needed to rotate the friction elements, i.e. the electric motor and the like, from the side of the steering wheel. As a result, the steering operation in starting turning the steering wheel may feel heavier than in a manual type steering system, with the possibility of degrading the steering feeling. In the case of the UK Publication, such problem is significant in a vehicle speed range exceeding the predetermined value where the electric motor is not driven.

On the other hand, in recent years, due to the advantage that complicated control functions can be achieved with a relatively simple system constitution, microcomputer systems fundamentally adapted for digital signal processes tend to be utilized as control means of various working devices.

In this respect, it would be desirable to utilize a microcomputer system in the form of a control device for such steering systems as described.

However, since in general microcomputer systems are unable to concurrently read many input signals and besides are adapted to execute signal processes thereof in a sequential manner depending on a system clock pulse, in attempts to utilize a microcomputer system to achieve control functions similar to those of an analogue control circuit of a conventional electric power steering system of the type described, for example, there is an attendant restriction or problem such that a predetermined process time is required.

In this respect, in cases where a feedback control is performed by using a microcomputer system, it is needed to repeat a feedback loop many times and such a problem as described above becomes significant.

For such reasons, in cases where a microcomputer system is utilized as a control device of an electric power steering system, there is an attendant possibility such that an electric motor for producing auxiliary torque can not be so controlled as to sufficiently follow up the speed of steering operation, thus resulting in the possibility of unsuccessful realization of optimum steering feeling.

In view of such problems in conventional electric power steering systems as described, the present invention has been achieved to effectively solve same. Particularly, the invention has been achieved to overcome the aforementioned restriction or problem attending thereon even in cases where for the solution of such problem a microcomputer system is utilized as a control device.

SUMMARY OF THE INVENTION

An object of the present invention is to provide an electric power steering system for vehicles which permits operations of a steering wheel at relatively high vehicle speeds to be started without frictional feeling and besides, also at relatively low vehicle speeds and at middle vehicle speeds, permits the operation of the steering wheel from its neutral position to the left or right to be started by relatively small steering forces without frictional feeling, so that smooth steering feeling can be achieved.

Another object of the present invention is to provide an electric power steering system for vehicles which, though employing a microcomputer system in the form of a control device of such electric power steering system as described above, permits an electric motor to be so controlled as to sufficiently follow up the speed of steering operation.

To achieve such object, the present invention provides an electric power steering system for vehicles having an electromagnetic servo device including an input shaft operatively connected to a steering wheel, an output shaft operatively connected to a steered wheel, an electric motor for operatively supplying auxiliary torque to the output shaft, a steering torque detecting means for detecting steering torque acting on the input shaft, a vehicle speed detecting means for detecting the speed of the vehicle, and a drive control means which receives an output signal from the steering torque detecting means and an output signal from the vehicle speed detecting means and feeds the electric motor with a motor drive signal in accordance with the output signals, wherein the drive control means comprises a first determining means for determining a component of the motor drive signal that corresponds to the load due to friction elements of the electromagnetic servo device and a component of the motor drive signal that corresponds to the load from the road surface side, depending on the output signal from the steering torque detecting means, a second determining means for determining a vehicle speed factor, depending on the output signal from the vehicle speed detecting means, a multiplying means for multiplying the road surface side load component by the vehicle speed factor to obtain a corrected road surface side load component, and an adding and outputting means for adding the frictional load component and the corrected road surface side load component to determine the magnitude of the motor drive signal and outputting the motor drive signal to the electric motor.

Preferably, the drive control means comprises a microcomputer unit which receives the output signal from the steering torque detecting means and the output signal from the vehicle speed detecting means and determines to output a motor control signal representing the content of the motor drive signal to be fed to the electric motor, and a motor drive means which receives the motor control signal and outputs the motor drive signal to the electric motor in accordance with the motor control signal, the first determining means and the second determining means comprise a program for the microcomputer unit, and the microcomputer unit determines the frictional load component, the road surface side load component, and the vehicle speed factor in an address designation manner, in dependence on the output signals from the detecting means, in accordance with the program.

The above and further features, objects, and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
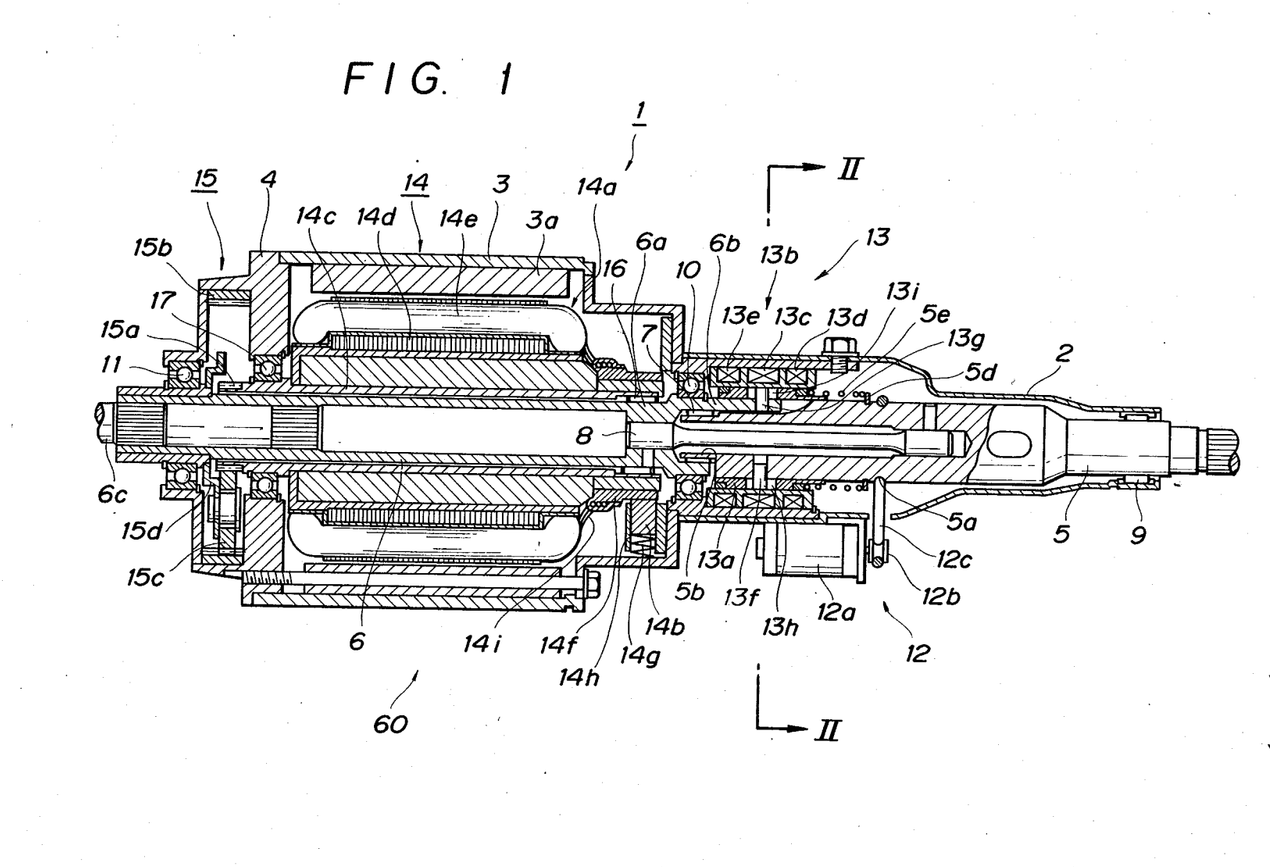
FIG. 1 is a longitudinal sectional view of an electromagnetic servo device as an essential part of an electric power steering system for vehicles according to a preferred embodiment of the present invention, the section being bent at 90° about the longitudinal axis of the electromagnetic servo device.

Referring to FIG. 1, designated at reference numeral 1 is an electromagnetic servo device as an essential part of an electric power steering system 60 for vehicles according to a preferred embodiment of the present invention. In FIG. 1, the electromagnetic servo device 1 is shown by a longitudinal quarter-cutaway section thereof as developed at 90° about the longitudinal axis. Designated at reference numeral 2 is a steering column, 3 is a stator, and 5 and 6 are input and output shafts arranged coaxial with each other. Moreover, designated at 6c is a power takeout shaft fitted to the output shaft 6 in a splined manner.

The input shaft 5 of the electromagnetic servo device 1 is connected at the outer end thereof to a steering wheel (not shown), and the power takeout shaft 6c of the output shaft 6 at the outer end thereof through a rack and pinion mechanism (not shown) to steered wheels (not shown). Through such arrangement, the steered wheels are caused to turn, following a rotating steering operation of the steering wheel.

A diameter-reduced inner end part 5a of the input shaft 5 is engaged to be fitted in a diameter-enlarged inner end part 6a of the output shaft 6 and rotatably supported through a bearing 7 therebetween. The input and output shafts 5, 6 are interconnected with each other by means of a torsion bar 8 arranged coaxial with both of them. Moreover, the input shaft 5 is rotatably supported by a bearing 9 to the steering column 2, and also the output shaft 6 is rotatably supported by a pair of bearings 10, 11 at the side of the steering column 2 and the side of a cover member 4 secured to the stator 3, respectively.

The electromagnetic servo device 1 further comprises a steering rotation speed sensor 12 arranged around the input shaft 5, a steering torque sensor 13 arranged around the mutual engagement portion of the input and output shafts 5, 6, an electric motor 14 as a direct-current machine and a reduction gear 15 both arranged around the output shaft 6, and a control circuit 16 (see FIG. 3) for driving to control the motor 14 in accordance with respective detection signals from the steering speed and the steering torque sensors 12, 13.

The steering speed sensor 12 comprises a direct-current generator 12a fixed to the outer circumference of the steering column 2. The axis of rotation of the generator 12a is arranged parallel to that of the input shaft 5, and at one axial end of the generator 12a there is installed a small-diameter pulley 12b. On the other hand, at an axial position corresponding to the pulley 12b, a large-diameter portion of the input shaft 5 has a belt groove 5a formed therein along the outer circumference thereof. Over the belt groove 5a and the pulley 12b there is stretched a belt 12c. Thus, as the input shaft 5 rotates with rotation of the steering shaft, the generator 12a is caused to rotate about the axis thereof. The generator 12a is adapted to then output a pair of signals (to be processed to output as later-described steering speed signals) in correspondence to the direction and speed of rotation of the input shaft 5 and, hence, of the steering wheel.

The steering torque sensor 13 is constituted as a differential transformer consisting of a tubular mobile core 13a axially slidably fitted on the outer circumference of the mutual engagement portion of the input and output shafts 5, 6 and a coil portion 13b fixed to the inner circumference of the steering column 2.

Figures 2A, 2B, 2C, 13:
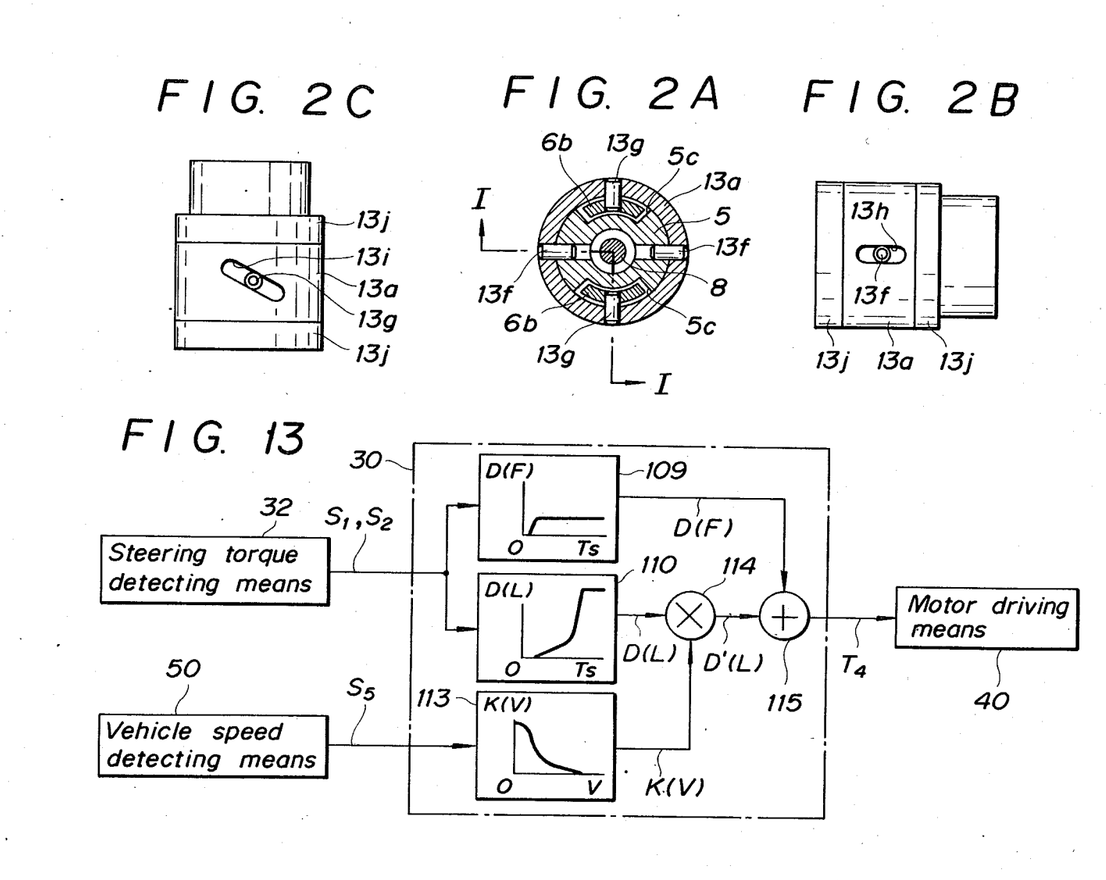
FIG. 2A is a cross-sectional view showing a mobile core of a steering torque sensor in the electromagnetic servo device, along line II—II of FIG. 1.
FIGS. 2B and 2C are side and plan views of the mobile core of FIG. 2A, respectively.
FIG. 13 is a schematic functional block diagram of the control circuit of FIG. 3.

As shown in FIG. 2A, the input shaft 5 has formed in the outer circumference thereof a pair of axially extending slots 5c circumferentially spaced apart at 180° from each other and, on the other hand, the output shaft 6 has a pair of projections 6b axially projected from the inner end part 6a at positions corresponding to the slots 5c, which projections 6b are inserted into the slots 5c, with predetermined gaps provided therebetween, respectively.

Further, as shown in FIGS. 2A to 2C, the mobile core 13a has elongate holes 13i and 13h formed therethrough, in which a pair of pins 13g radially outwardly projected from the projections 6b of the output shaft 6 respectively and another pair of pins 13f radially outwardly projected from the input shaft 5 at circumferentially 90° displaced positions with respect to the pins 13g respectively are engaged, respectively. The elongate holes 13i are inclined at a necessary angle relative to the axial direction, while the elongate holes 13h are formed in parallel with the axial direction. Therefore, with steering torque acting on the input shaft 5, when such a state is brought into existence that, although the steering torque is transmitted through the torsion bar 8 also to the output shaft 6, because the load at the the shaft 6 side is larger than this torque the input and output shafts 5, 6 have a circumferential relative angular difference developed therebetween, thus accompanying a distortion of the torsion bar 8, it then so follows that the core 13a is moved in the axial direction. In other words, the core 13a is axially displaced in correspondence to steering torque acting on the input shaft 5. The mobile core 13a is made of a magnetic material at the middle part thereof and has integrally formed non-magnetic current-conductive parts 13j, 13j at both ends thereof. Moreover, as shown in FIG. 1, between the right end of the mobile core 13a and a stop flange 5d fixed on the input shaft 5 there is interposed a compressed spring 5e made of a non-magnetic material, whereby the core 13a is normally urged in the leftward direction to thereby prevent such lost motion that otherwise might be caused by those clearances between the pins 13f, 13g and the elongate holes 17h, 17i which are due to errors in manufacture.

The coil portion 13b is disposed around the mobile core 13a and comprises a primary coil 13c to which a pulse-like alternating-current signal is input and a pair of secondary coils 13d, 13e which are disposed at both sides of the primary coil 13c and adapted to output a pair of signals corresponding to the axial displacement of the core 13a.

At the steering torque sensor 13 with such constitution as described, therefore, when a circumferential relative angular difference is developed between the input and output shafts 5, 6 following a steering operation of the steering wheel, it is converted first into an axial displacement of the mobile core 13a and then therefrom into the respective signals to be electrically output from the secondary coils 13d, 13e.

Figure 3:
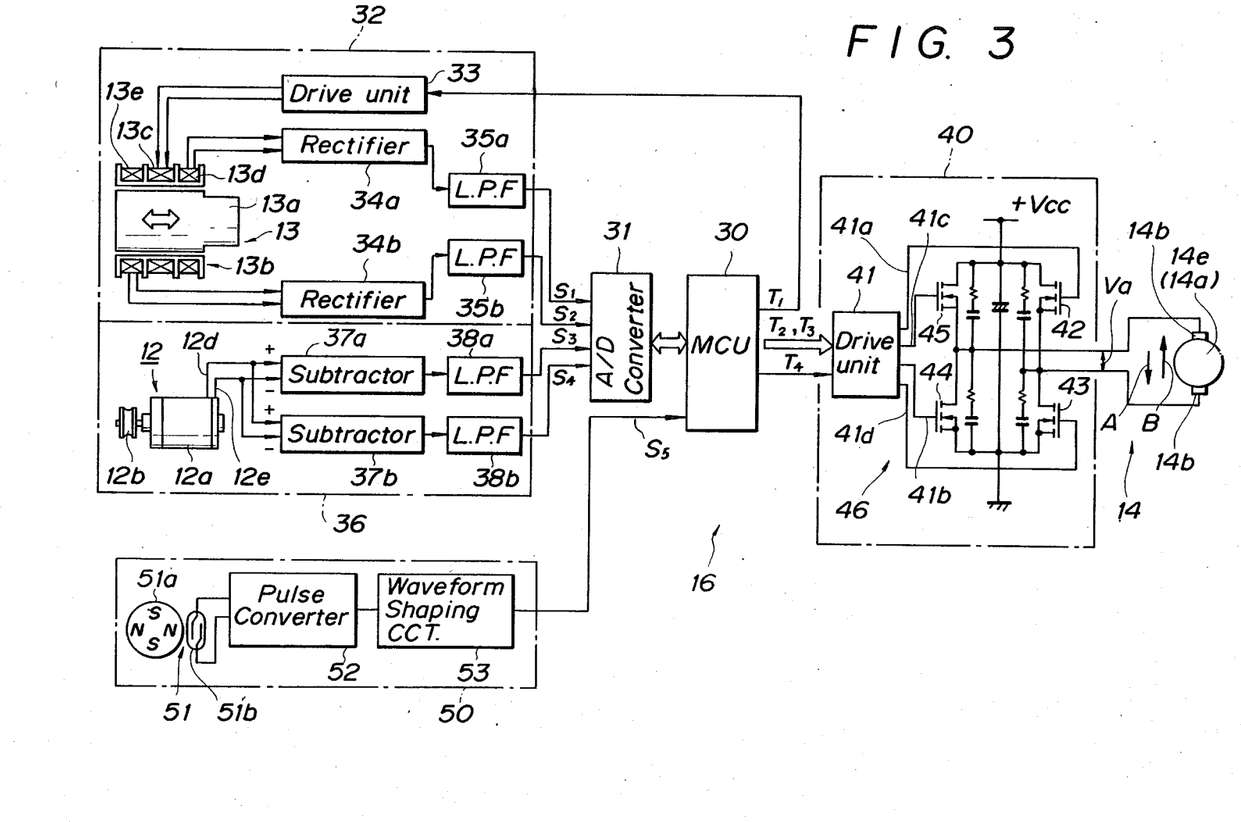
FIG. 3 is a diagram showing in detail a control circuit of the electromagnetic servo device.

More particularly, in the case where, exemplarily under such a condition that steering torque with a tendency to produce clockwise rotation when viewed at the side of the steering wheel is applied to the input shaft 5 while a larger load than the steering torque is imposed on the output shaft 6, the input shaft 5 is thus rotated relative to the output shaft 5 in the clockwise direction when viewed at the steering wheel side, then the mobile core 13a is caused to move rightwardly in FIG. 1 and FIG. 2B as well as in FIG. 3 that will be described later, that is, upwardly in FIG. 2C.

To the contrary, in the case where the input shaft 5 is rotated relative to the output shaft 6 in the counterclockwise direction when viewed at the steering wheel side, then the mobile core 13a is caused to move in the opposite direction to the above.

In each of the foregoing cases, the mobile core 13a is displaced in either axial direction thereof at a distance from an original middle position thereof in proportion to the circumferential relative angular difference between the input and output shafts 5, 6, because the inclined elongate holes 13i of the core 13a, which are engaged with the pins 13g provided at the side of the output shaft 6, are so shaped as to have a straight-linear form when the core 13a of a tubular form is developed.

In this respect, the mobile core 13a is arranged so as to rest on the original middle position under the condition that, without steering torque acting on the input shaft 5, no circumferential relative angular difference is developed between the input and output shafts 5, 6. In the state shown in FIGS. 1 and 2A to 2C, the mobile core 13a is located at such middle position.

Incidentally, due to an engagement relation between the projections 6b of the output shaft 6 and the slots 5c of the input shaft 5, the circumferential relative angular difference between the shafts 5, 6 is controlled so as not to exceed a predetermined value. Namely, when the relative angular difference between the shafts 5, 6 is increased, along with a steering operation causing the input shaft 5 to rotate, to the predetermined value in concern, then one side face of each of the projections 6b is brought into abutment with one side face of corresponding one of the slots 5c so that, thereafter, the output shaft 6 is caused to integrally rotate with the input shaft 5. Such engagement relation between the projections 6b and the slots 5c plays a roll of a fail-safe mechanism of the electromagnetic servo device 1. In this respect, it will be understood that, under the condition that the driving of the electric motor 14 is stopped as will be described later, by functions of the fail-safe mechanism and the torsion bar 8 the electric power steering system 60 is adapted for manual steering operations to be performed without assist power.

The electric motor 14 comprises the aforementioned stator 3 which is integrally joined to the steering column 2, at least one pair of magnets 3a secured to the inner circumference of the stator 3, a rotor 14a rotatably arranged around the output shaft 6, and a pair of brushes 14b adapted, in brush holders 14h fixed to the stator 3, to be radially inwardly pushed with springs 14g. The rotor 14a includes a tubular shaft 14c rotatably supported with respect to the output shaft 6 and the stator 3 by roller and ball bearings 16, 17, respectively. The tubular shaft 14c is arranged coaxial with the output shaft 6, and has integrally fixed on the outer circumference thereof a laminated ferrous core 14d formed with skew slots and multiple windings 14e laid thereon. A predetermined fine air gap is left between the inner circumferences of the magnets 3a and the outer circumferences of the windings 14e. Moreover, the shaft 14c has fixed thereon a commutator 14f circumferentially equi-angularly divided into a plurality of segments to be connected to terminals 14i of the windings 14e respectively, against which commutator 14f the brushes 14b are elastically pushed to be kept in contact therewith.

The reduction gear 15 comprises a sun gear 15a formed along the outer circumference of the output end part of the tubular shaft 14c of the electric motor 14, a ring gear 15b formed along the inner circumference of the cover member 4, three planet gears 15c interposed between the sun and ring gears 15a, 15b, and a carrier member 15d for rotatably supporting the respective planet gears 15c, the carrier member 15d being secured to the output shaft 6. By such constitution, the reduction gear 15 is adapted to effect necessary transmission of torque. As will be understood, the rotation of the electric motor 14 is transmitted through the reduction gear 15, where it is reduced in speed, to the output shaft 6.

Next, with reference to FIG. 3, description will be made of the control circuit 16..

In FIG. 3, designated at reference numeral 30 is a microcomputer unit (hereinbelow called "MCU 30"). To the MCU 30, there are input through an A/D converter 31 respective detection signals $S_1$ to $S_4$ from a steering torque detection circuit 32 and a steering rotation speed detection circuit 36, in accordance with commands from the MCU 30. Moreover, from a vehicle speed detection circuit 50, another detection signal $S_5$ is input to the MCU 30, through an I/O port thereof, in accordance with a commond from the MCU 30.

The steering torque detection circuit 32 comprises the aforementioned steering torque sensor 13, a drive unit 33 through which a clock pulse $T_1$ generated in the MCU 30 is divided at a number of stages and amplified to be output in the form of an alternating-current signal of a rectangular or sinusoidal wave to the primary coil 13c of the sensor 13, a pair of rectifiers 34a, 34b for rectifying the respective electric signals output from the secondary coils 13d, 13e of the torque sensor 13 in accordance with the axial displacement of the mobile core 13a, and a pair of low pass filters 35a, 35b for eliminating high-frequency components from respective output signals of the rectifiers 34a, 34b to thereby convert these signals into stable direct-current voltage signals to be output as steering torque detection signals $S_1$, $S_2$.

The steering speed detection circuit 36 comprises the direct-current generator 12a of the steering speed sensor 12, the generator 12a having a pair of terminals 12d, 12e for outputting the aforementioned signals therefrom, a pair of subtractors 37a, 37b for subtracting respective values of these output signals from each other, and a pair of low-pass filters 38a, 38b for eliminating high-frequency components from respective output signals of the subtractors 37a, 37b to obtain a pair of signals to be output as steering speed detection signals $S_3$, $S_4$.

The vehicle speed detection circuit 50 includes a vehicle speed sensor 51 consisting of a magnet 51a connected to a speedometer cable so as to be rotatable therewith and a reed switch 51b adapted to perform make-and-break actions in accordance with the rotation of the magnet 51a. The detection circuit 50 further comprises a pulse converter 52 for applying electric power to the reed switch 51b and outputting a pulsatory signal in correspondence to the make-and-break actions of the switch 51b, and a waveform shaping circuit 53 for shaping the waveform of the pulsatory signal from the pulse converter 52 to thereby provide a rectangular pulse signal to be output as detection signal $S_5$.

The MCU 30 comprises such unshown necessary parts as the I/O port, a memory, an arithmetic logical unit, a controller, and a clock generator to which a clock pulse of a crystal oscillator is input.

The MCU 30 as well as the circuits 32, 36, 50 and a later-described motor drive circuit 40 is supplied with electric power from a battery (not shown) through an ignition switch (not shown). Thus, while the ignition switch is turned on, the MCU 30 is put in an energized state thereof, where it is permitted to process the respective input signals $S_1$ to $S_4$ and $S_5$ from the detection circuits 32, 36 and 50, following a program stored in the memory, to output control signals $T_2$, $T_3$, and $T_4$ to be used for driving the electric motor 14 to the motor drive circuit 40, to thereby control the driving of the motor 14. In those control signals, $T_2$ and $T_3$ are direction of rotation representative signals responsible for determining the terminal polarity of an armature voltage Va to be impressed to the electric motor 14 in correspondence to the steering direction, and $T_4$ is a signal responsible for determination of magnitude of the armature voltage Va.

The motor drive circuit 40 comprises a drive unit 41, and a bridge circuit 46 consisting of four FET's (field effect transistors) 42, 43, 44, 45. Of the four FET's, two 42, 45 that constitute two neighboring sides of the bridge have respective drain terminals thereof connected to the positive side of the battery and source terminals thereof connected to drain terminals of the remaining two 43, 44, respectively. Respective source terminals of these FET's 43, 44 are both connected to the earth as common side and thus to a negative terminal of the battery. The four FET's 42, 43, 44, 45 have gate terminals thereof connected to output terminals 41a, 41d, 41b, 41c of the drive unit 41, respectively. The respective source terminals of the FET's 42, 45 are connected as output terminals of the bridge circuit 40 through the brushes 14*b* to the armature windings 14*e* of the electric motor 14.

The drive unit 41 is adapted to output a signal from the terminal 41*a* or 41*c* for exclusively driving to turn on the FET 42 or 45 in accordance with the signals $T_2$, $T_3$ sent as motor rotation direction control signals from the MCU 30 and, concurrently, to output a signal from the terminal 41*b* or 41*d* for exclusively bringing the FET 44 or 43 into a drivable state thereof, to thereby control the driving of the electric motor 14. In the case of the signal from the terminal 41*b* or 41*d*, a frequency-constant rectangular pulse signal of a battery level is modulated in pulse duration, to be exclusively output to the gate of the FET 44 or 43, in accordance with the signal $T_4$ as a motor voltage control signal.

In the motor drive circuit 40, therefore, in accordance with the control signals $T_2$, $T_3$, $T_4$, one 42 of the two FET's 42, 45 and the FET 44 cooperating therewith are driven to be turned on and to be controlled in a PWM manner, respectively, or likewise the other FET 45 and the FET 43 cooperating therewith are on-driven or PWM-driven, respectively, to thereby control the direction of rotation and output power (number of revolutions and torque) of the electric motor 14.

In this respect, for example, in the case the FET's 42 and 44 are driven as described above, the armature voltage Va has a magnitude proportional to the pulse duration of the pulse signal output from the terminal 41*b* of the drive unit 41 and such a polarity that conducts an armature current Ia in a direction B causing the electric motor 14 to rotate clockwise. To the contrary, in the case the FET's 45 and 43 are driven, the magnitude of the armature voltage Va is in proportion to the pulse duration of the pulse signal from the terminal 41*d* of the unit 41 and the polarity thereof is so determined as to conduct the armature current Ia in a direction A causing the motor 14 to rotate counterclockwise.

There will be described below various programmed functions of the MCU 30.

Figure 4A:
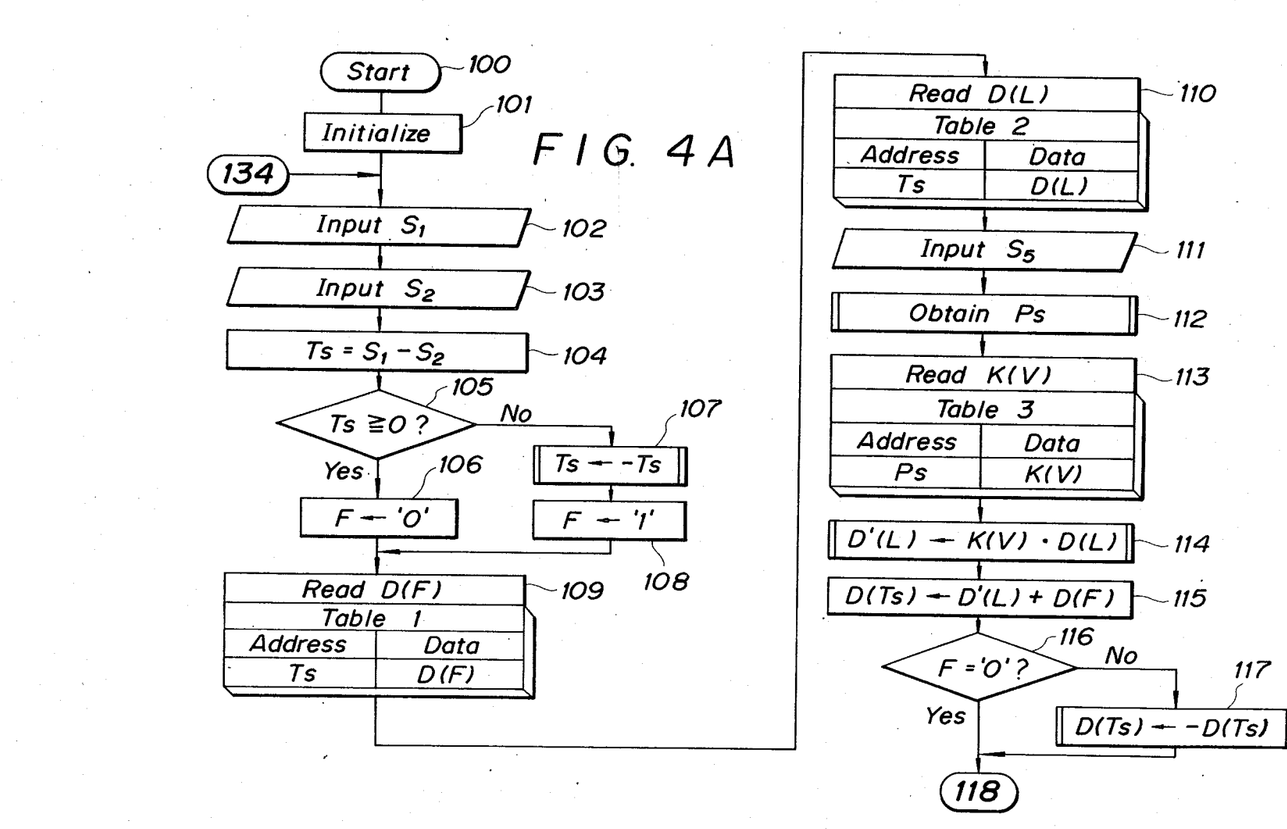
FIGS. 4A and 4B are schematic flowcharts of control processes to be executed by a microcomputer unit in the control circuit of FIG. 3.
Figure 4B:
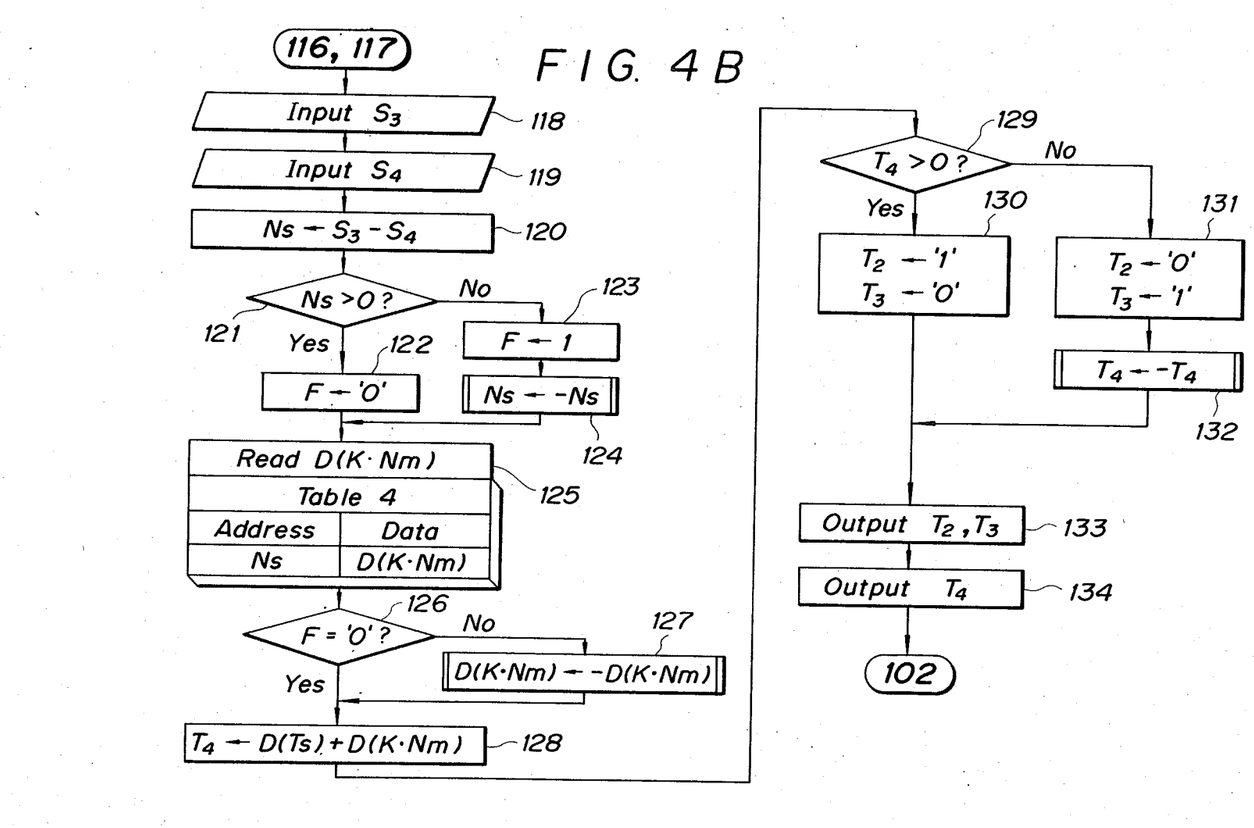

FIGS. 4A and 4B are flowcharts showing the outline of control processes to be executed at the MCU 30. In those Figures, designated at reference numerals 100 to 134 are associated process stages.

By turning on the ignition switch, the MCU 30 as well as other associated circuits is applied with electric power and permitted to exhibit control functions thereof.

First, at stage 101, respective registers and data of a RAM as well as necessary circuits in the MCU 30 are initialized.

Next, at stages 102, 103, the steering torque detection signals $S_1$, $S_2$ are read in turn. Though not shown, subsequently to the stage 103, there is made a diagnosis whether respective values of the read signals $S_1$, $S_2$ are normal or not. If an abnormality is found, then the feed of the control signals $T_2$, $T_3$, $T_4$ from the MCU 30 to the motor drive circuit 40 is interrupted, so that the driving of the electric motor 14 stops, allowing manual steering operations to be performed without assist power.

Figure 5:
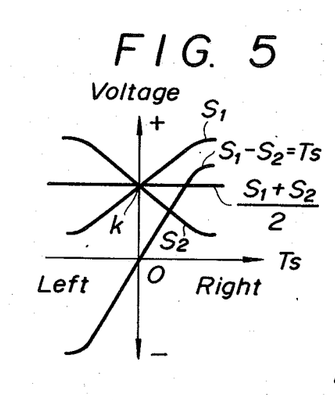
FIG. 5 is a graph showing characteristics of a steering torque detection signal.

In this respect, since the steering torque sensor 13 is constituted in the form of a differential transformer, if the detection circuit 32 is normal the detection signals $S_1$, $S_2$ have such relations to steering torque Ts as shown in FIG. 5, so that half of the sum of the signals $S_1$, $S_2$ becomes a substantially constant value k. Thus, though not shown, after the stage 103, there is made a judgment whether or not the difference between $(S_1+S_2)/2$ and k is found within a predetermined range and, in the case it is not within the predetermined range, the steering torque detection circuit 32 is concluded to be out of order. In the case the steering torque detection signals $S_1$, $S_2$ as read are normal, the flow goes to stage 104. In this regard, because, as described in conjunction with FIG. 2A, side faces of the projections 6*b* of the output shaft 6 are brought into abutment with corresponding side faces of the slots 5*c* of the input shaft 5, in those ranges in FIG. 5 in which steering torque Ts has exceeded a predetermined value in either of leftward and rightward directions the values of the detection signals $S_1$, $S_2$ are kept constant.

At the stage 104, there is made a calculation of $S_1-S_2$, letting the result be a value of steering torque Ts. In practical cases, however, to obtain one of continuous integers as the value of Ts, the result of $S_1-S_2$ may be multiplied by a predetermined numeral and then substituted for Ts. Like comment is applicable also to stages 112, 120 that will be described later.

Next, at decision stage 104, to discriminate the acting direction of steering torque Ts, there is made a judgment whether the value of Ts is positive or negative. And, if the acting direction of steering torque Ts is clockwise, that is, if the value thereof is positive or zero, the flow goes through stage 106, where a flag F is made such that F='0', to stage 109. If the steering torque Ts has a negative value, the flow goes through stage 107, where a convertion process is executed to make the steering torque Ts an absolute value such that Ts=−Ts, to stage 108 for making the flag F such that F='1' and then to the stage 109. At this stage, the flag F is used as a parameter representing the sign of the value of steering torque Ts, that is, the acting direction thereof.

Figure 6:
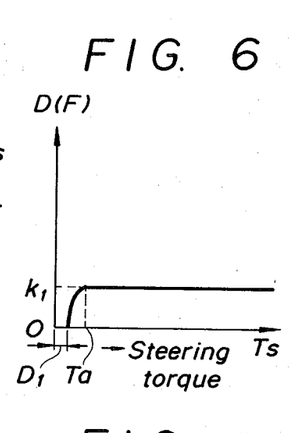
FIG. 6 is a graph showing a duty value attributable to a frictional load of the electromagnetic servo device.

At the stage 109, in dependence on the absolute value of steering torque Ts, a content of a table 1 in a ROM (unshown) is directly read in an address designation manner. In the table 1, which is stored in advance in the ROM, there are listed such duty values D(F) as attributable to various total frictional loads due to friction elements of the servo device 1, which values D(F) have such a relation to the absolute value of steering torque Ts as shown by FIG. 6. In FIG. 6, $D_1$ represents a dead zone. The table 1 is prepared such that, in a region in which the magnitude of Ts is larger than a predetermined value Ta, D(F) has a constant value $k_1$, where $k_1$ is a necessary duty value for the motor 14 to produce a torque component corresponding to the friction element attributed load of the device 1. The duty value D(F) is prepared so as to appear as such a component of the armature voltage Va that corresponds to the frictional load of the device 1. Thereafter, the flow goes to stage 110.

Figure 7:
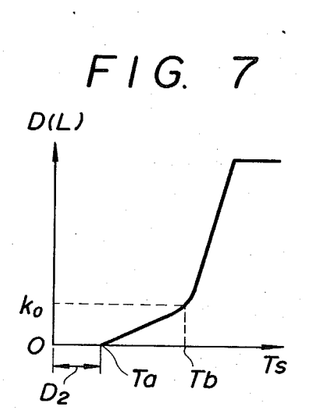
FIG. 7 is a graph showing a duty value attributable to a load from the road surface side.

At the stage 110, in dependence on the absolute value of steering torque Ts, a content of a table 2 in the ROM is directly read in an address designation manner. In the table 2, which is stored in advance in the ROM, there are listed such duty values D(L) as attributable to various loads from the road surface side, which values D(L) have such a relation to the absolute value of steering torque Ts as shown by FIG. 7. In FIG. 7, $D_2$ represents a dead zone preset wider than the dead zone $D_1$ of FIG. 6. As will be seen from FIG. 7, the duty value D(L) remains zero while Ts increases from zero till it reaches the predetermined value Ta. Moreover, the content of the table 2 is prepared such that D(L) has a value $k_0$ when the steering torque Ts is increased to a predetermined value Tb. Incidentally, the duty value D(L) is equal to a duty value D(Ia·Ra) attributable to a term of Ia·Ra in an expression of the armature voltage Va, where Ia is the armature current of the electric motor 14 and Ra is the sum of resistances such as of the armature windings, brushes, and wiring. Consequently, at the stage 110, there is read such a content of memory that has an address represented by the absolute value of steering torque Ts, that is, the duty value D(L) corresponding to the road surface side load. Incidentally, in practice, at the stage 110, D(L) is to be read in an address designation manner after an initial address of the table 2 was added as a bias value to the absolute value of steering torque Ts. Similar comment is applicable also to stages 113, 125 that will be described later. The duty value D(L) is prepared so as to appear as such a component of the armature voltage Va that corresponds to the road surface side load. Thereafter, the flow goes to stage 111.

At the stage 111, the detection signal S5 output from the vehicle speed detection circuit 50 is read.

Next, at stage 112, the pulse period of the detection signal S5 is obtained as Ps. Then, the flow goes to stage 113.

Figure 8:
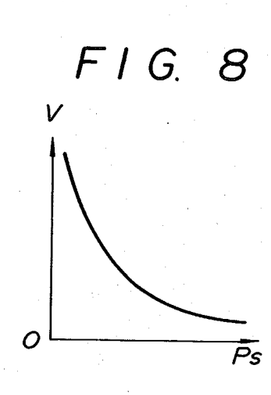
FIG. 8 is a graph showing a relation between the period of an output pulse signal of a vehicle speed sensor and the vehicle speed.
Figure 9:
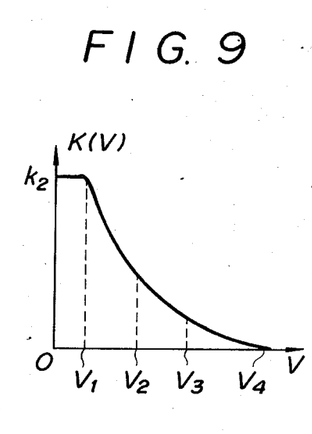
FIG. 9 is a graph showing a relation between the vehicle speed and a factor for the road surface side load attributed duty value.

At the stage 113, in dependence on the obtained value of the pulse period Ps, a content of a table 3 in the ROM is directly read in an address designation manner. In the table 3, which is stored in advance in the ROM, there are listed various values of a factor K(V) which is related to the pulse period Ps so as to progressively decrease, as the period Ps becomes smaller, and become zero in a range where Ps has become smaller than a predetermined value. In this respect, the pulse period Ps has such a relation to the vehicle speed V as shown by FIG. 8, and the vehicle speed V has such a relation to the the factor K(V) as shown by FIG. 9. As will be seen from FIG. 9, the factor K(V) takes a predetermined value $k_2$ in an interval of V where $0 \leq V < V_1$, and progressively decreases as the vehicle speed V increases in an interval where $V_1 \leq V < V_4$, then becomes zero in such an interval that $V_4 \leq V$, where $V_1$ and $V_4$ are predetermined values of the vehicle speed V. Further, in the same Figure, designated by reference characters $V_2$ and $V_3$ are predetermined intermediate values of the vehicle speed V between $V_1$ and $V_4$, such that $V_1 < V_2 < V_3 < V_4$. Accordingly, it will be comprehended that interval $0 \leq V < V_1$ represents a low vehicle speed range, $V_1 \leq V < V_3$ a middle vehicle speed range, $V_3 \leq V < V_4$ a range of relatively high vehicle speeds, and $V_4 \leq V$ a high vehicle speed range. After the stage 113, the flow goes to stage 114.

At the stage 114, the road surface side load attributed duty value D(L) is multiplied by the factor K(V), letting the result be a corrected duty value D'(L) of the road surface side load component.

Figure 10:
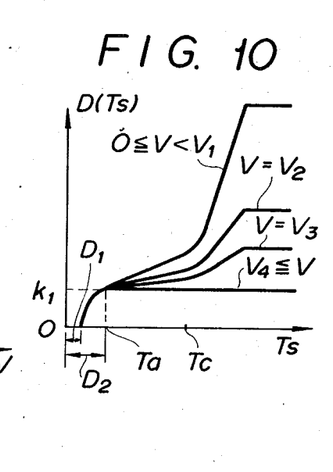
FIG. 10 is a graph showing for various vehicle speeds a relation between steeriong torque and a provisional control signal of an electric motor.

Then, at stage 115, there is executed an arithmetic process of addition D'(L)+D(F) and the result is stored as a provisional duty value D(Ts) for the control signal T4. In this respect, the duty value D(Ts) has such relations to Ts as shown by FIG. 10. As will be seen from this Figure, as the steering torque Ts increases, exceeding the dead zone $D_1$ and approaching a limit of the dead zone $D_2$, the duty value D(Ts) gradually increases from zero, irrespective of the value of vehicle speed V. Then, at the time when the steering torque Ts has reached the limit of the dead zone $D_2$, that is, when Ts=Ta, the duty value D(Ts) has the value $k_1$. In a region where the steering torque Ts is in excess of the dead zone $D_2$, the duty value D(Ts) follows one of various characteristic curves, depending on the value of vehicle speed V. In FIG. 10, there are shwon four characteristic curves corresponding to such cases that $0 \leq V < V_1$, $V=V_2$, $V=V_3$, and $V_4 \leq V$, respectively. As will be seen, in the case of $V_4 \leq V$, the provisional duty value D(Ts) is always equal to the frictional load attributed duty value D(F). Thereafter, the flow goes to stage 116.

At the decision stage 116, to provide the provisional duty value D(Ts) with a sign corresponding to the direction of steering torque Ts, there is made a judgment about the content of the flag F as it is then given. If F='0', then the steering torque Ts should be clockwise and the flow directly goes to stage 118. To the contrary, if F='1', then Ts should be counterclockwise and the flow goes to the stage 118 through stage 117, where the duty value D(Ts) is stored as a negative value.

At the stage 118 and stage 119, the detection signals S3, S4 from the steering speed detection circuit are read in turn. Though not shown, subsequently to the stage 119, there also is made a diagnosis whether thus read values are normal or not. If an abnormality is found, then the feed of the control signals T2, T3, T4 from the MCU 30 to the motor drive circuit 40 is interrupted, so that the driving of the electric motor 14 stops, allowing manual steering operations to be performed without assist power.

Figure 11:
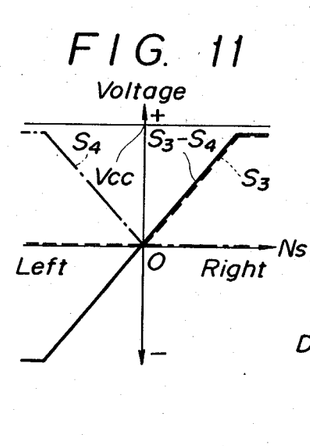
FIG. 11 is a graph showing characteristics of a steering speed detection signal.

In this respect, if the detection circuit 36 is normal, the detection signals S3, S4 have such relations to steering speed Ns as shown in FIG. 11. Thus, in a case where respective direct-current voltage levels of the detection signals S3, S4 concurrently take positive values and in a case where either the detection signal S3 or S4 is substantially equal to a battery level Vcc, the steering speed detection circuit 36 is judged to be abnormal. In this concern, the generator 12a of the circuit 36 has such a characteristic that renders the expectable highest level of the signals S3, S4 lower than Vcc by a predetermined appreciable voltage difference.

In the case the detection signals S3, S4 as read at the stages 118, 119 are judged normal, the flow goes to stage 120, where a calculation of S3–S4 is made, letting the result be a value of the steering speed Ns.

Next, at stage 121, to discriminate the direction of steering speed, there is made a judgment whether the value of Ns is positive or negative. And, if the steering speed is of clockwise rotation, that is, if Ns is positive or zero, the flow goes to stage 122, where the flag F is made such that F='0'. If the steering speed is of counterclockwise rotation, that is, if Ns is negative, the flow goes to stage 123 for making the flag F such that F='1', and thereafter to stage 124, where a convertion process is executed to make the steering speed Ns an absolute value such that Ns=–Ns. Thereafter, the flow goes to stage 125.

Figure 12:
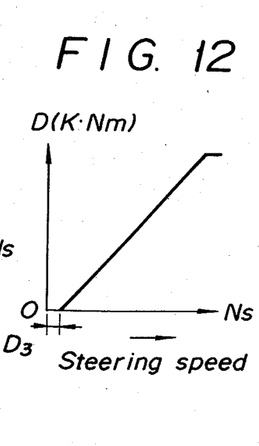
FIG. 12 is a graph showing a duty value attributable to the steering speed.

At the stage 125, in dependence on the absolute value of steering speed Ns, a content of a table 4 in the ROM is directly read in an address designation manner. In the table 4, which is stored in advance in the ROM, there are listed those duty values D(K·Nm) which correspond to various induction voltages K·Nm of the electric motor 14 that have such a relation to the absolute value of steering speed Ns as shown by FIG. 12. In FIG. 12, $D_3$ represents a dead zone. K is a constant in terms of induced electromotive force of the motor 14, and Nm the speed of rotation of the motor 14. Accordingly, at the stage 125, such a content of memory that has an address represented by the absolute value of steering speed Ns, that is, a duty value $D(K \cdot Nm)$ of $K \cdot Nm$ is read. In this respect, between the armature voltage Va and armature current Ia of the electric motor 14, there is such a relation that $Va = Ia \cdot Ra + K \cdot Nm$, where Ra is the internal resistance of the motor 14. Moreover, it will be understood that, since the rotation of the electric motor 14 is transmitted through the reduction gear 15 to the output shaft 6 and the reduction ratio of the reduction gear 15 is constant, the induction voltage $K \cdot Nm$ of the motor 14 depends on the steering speed Ns. Incidentally, the duty value $D(N \cdot Nm)$ is prepared so as to appear as that component of the armature voltage Va which corresponds to the steering speed Ns.

Thereafter, the flow goes to stage 126.

At the stage 126, to provide the duty value $D(K \cdot Nm)$ of the steering speed Ns attributed component with a sign corresponding to the direction of the steering speed Ns, there is made a judgment about the content of the flag F as it is then given. If $F = '0'$, then the direction of steering speed Ns is clockwise and the flow directly goes to stage 128. To the contrary, if $F = '1'$, then the direction of steering speed Ns is counterclockwise and the flow goes to the stage 128 through stage 127, where the duty value $D(K \cdot Nm)$ is stored as a negative value.

At the stage 128, there is taken the sum of the duty values $D(Ts)$ and $D(K \cdot Nm)$ as thus obtained and the result is stored as a determined value of the control signal $T_4$ that constitutes the basis of the magnitude of the armature voltage Va to be applied to the electric motor 14. Strictly speaking, the value of the signal $T_4$ as now given is a duty value of the pulse signal to be fed from the drive unit 41 to the FET 43 or 44.

Next, at decision stage 129, to discriminate the polarity of armature voltage Va, there is made a judgment of the sign of thus obtained $T_4$. If $T_4$ is positive, the flow goes to stage 130, where the motor drive direction responsible control signals $T_2$, $T_3$ have their values given such that $T_2 = '1'$, $T_3 = '0'$. To the contrary, if the value of $T_4$ is zero or negative, the flow goes to stage 131.

At the stage 131, the signals $T_2$, $T_3$ are set such that $T_2 = '0'$ and $T_3 = '1'$. Then, the flow goes to stage 132 to execute a process for convertion to absolute value. In other words, at the stage 132, $T_4$ is multiplied by a factor of $-1$ and thereby converted into a positive value. Thereafter, the flow goes to stage 133.

At the stage 133, there are output the signals $T_2$, $T_3$; and at the next stage 134, the signal $T_4$. Thereafter, the flow again goes to the stage 102.

In the foregoing arrangement, the drive unit 41 of the motor drive circuit 40 is adapted to output the control signals from the terminals 41a to 41d, as necessary for the control of magnitude and polarity of the armature voltage Va, such that, when $T_2 = '1'$ and $T_3 = '0'$, the FET 42 is turned on and the FET 44 is put in a drivable state and, when $T_2 = '0'$ and $T_3 = '1'$, the FET 45 is turned on and the FET 43 is put in a dribvable state. As described, the signal $T_4$ is responsible for determination of the magnitude of armature voltage Va to be impressed from the bridge circuit 46 to the electric motor 14. For example, in the case the direction control signals $T_2$, $T_3$ have such values that $T_2 = '1'$ and $T_3 = '0'$, the FET 44 is to be PWM-driven in accordance with the signal $T_4$. To the contrary, in the case they have such values that $T_2 = '0'$ and $T_3 = '1'$, the FET 43 is PWM-driven in accordance with the signal $T_4$.

In the programmed procedure above, at the stages 109, 10, 113 and 125, where the duty value $D(F)$ attributed to the frictional load due to friction elements, the duty value $D(L)$ attributed to the load surface side load, the vehicle speed factor $K(V)$, and the duty value $D(K \cdot Nm)$ attributed to steering speed Ns are determined, respectively, the determination of these duty values is directly made in an address designation manner without complicated computation processes. Accordingly, the necessary time for the flow to go around the stages 102 to 134 is substantially constant, whereas such necessaty time can be set in advance in relation to the constitution of the MCU 30.

FIG. 13 is a diagram in which various functions of the control circuit 16 are schematically represented by use of blocks, while showing interrelations between such essential elements of the circuit 16 that are shown in FIG. 3 and associated process stages in the process flow of FIGS. 4A and 4B. However, from this Figure are omitted the steering speed detection circuit 36, the provisional duty value $D(Ts)$, the steering speed attributed duty value $D(K \cdot Nm)$, and the control signals $T_2$, $T_3$.

According to such control processes as described of the stages 100 to 134, the electric motor 14 basically is controlled to be driven in consideration of the vehicle speed V. Namely, if the steering torque Ts is kept at a certain value, exemplarily at a value Tc in FIG. 10, it then so follows that, as the vehicle speed V increases from zero to the predetermined value $V_4$, the auxiliary torque to be produced by the electric motor 14 gradually becomes smaller. Moreover, even in the case the vehicle speed V has exceed the value $V_4$, such auxiliary torque is produced by the motor 14 that corresponds to the steering load due to the friction elements of the electromagnetic servo device 1. Therefore, even while the vehicle is traveling at a high speed exceeding the predetermined value $V_4$, the operation of the steering wheel is permitted to be started without frictional feeling.

Further, even under the condition that the vehicle is traveling at a speed not exceeding the predetermined value $V_4$, i.e. at a relatively high, middle, or low speed, the frictional load attributed duty value $D(F)$ as well as the road surface side load attributed duty value $D(L)$ is taken into account to determine the control signal $T_4$ on which the armature voltage Va to be impressed to the electric motor 14 depends. More particularly, in cases where the steering speed Ns is small and also the road surface side load attributed duty value $D(L)$ attending thereon is small, the provisional duty value $D(Ts)$ for the control signal $T_4$ leads to the value $k_1$ corresponding to the frictional load attributed component, as shown in FIG. 10, even when the steering torque Ts is equal to the upper limit Ta of the dead zone $D_2$ as shown in FIG. 7, for example.

Accordingly, even in the case a steering operation of the steering wheel from the neutral position to the left or right is started at a low speed with a relatively small force under the condition that the vehicle is traveling at a relatively high, middle, or low speed, the electric motor 14 is adapted to produce such auxiliary torque that corresponds to the steering load due to friction elements of the electromagnetic servo device 1. Thus, it is permitted to achieve smooth steering feeling free of frictional feeling, when starting turning the steering wheel.

Moreover, in the embodiment above, though employing the control circuit 16 including the MCU 30 as a control device of the entirety of the steering system 60, the duty values D(F), D(L), D(K·Nm) and vehicle speed factor K(V) as parameters for determining the control signal $T_4$ are determined from the signals $S_1$, $S_2$, $S_3$, and $S_4$, fundamentally in an address designation manner. As a result, the electric motor 14 is permitted to be so controlled as to sufficiently quickly follow up the steering speed Ns.

Incidentally, it will be understood that the steering feeling may be adequately changed by properly modifying the content of the tables 1 to 4.

Further, in the control circuit 16, instead of the MCU 30 there may be employed such a circuitry that has compatible functions.

Although there has been described what is at present considered to be the preferred embodiment of the invention, it will be understood that the present invention may be embodied in other specific forms without departing from the spirits or essential characteristics thereof. The present embodiment is therefore to be considered in all respects as illustrative and not restrictive. The scope of the invention is indicated by the appended claims rather than by the foregoing description.

I claim:

1. An electric power steering system (60) for vehicles having an electromagnetic servo device (1) including an input shaft (5) operatively connected to a steering wheel, an output shaft (6) operatively connected to a steered wheel, an electric motor (14) for operatively supplying auxiliary torque to said output shaft (6), steering torque detecting means (32) for detecting steering torque (Ts) acting on said input shaft (5), vehicle speed detecting means (50) for detecting the speed (V) of the vehicle, and drive control means (30, 40) which receives an output signal ($S_1$, $S_2$) from said steering torque detecting means (32) and an output signal ($S_5$) from said vehicle speed detecting means (50) and feeds said electric motor (14) with a motor drive signal (Va) in accordance with said output signals ($S_1$, $S_2$, $S_5$), wherein:

said drive control means (30, 40) comprises:

first determining means (109, 110) for determining a component (D(F)) of said motor drive signal (Va) that corresponds to the load due to friction elements of said electromagnetic servo device (1) and a component of said motor drive signal (Va) that corresponds to the load from the road surface side, depending on said output signal ($S_1$, $S_2$) from said steering torque detecting means (32);

second determining means (113) for determining a vehicle speed factor (K(V)), depending on said output signal ($S_5$) from said vehicle speed detecting means (50);

multiplying means (114) for multiplying said road surface side load component (D(L)) by said vehicle speed factor (K(V)) to obtain a corrected road surface side load component (D'(L)); and adding and outputting means (115, 128, 40) for adding said frictional load component (D(F)) and said corrected road surface side load component (D'(L)) to determine the magnitude of said motor drive signal (Va) and outputting said motor drive signal (Va) to said electric motor (14).

2. An electric power steering system for vehicles according to claim 1, wherein:

said drive control means (30, 40) comprises:

a microcomputer unit (30) which receives said output signal ($S_1$, $S_2$) from said steering torque detecting means (32) and said output signal ($S_5$) from said vehicle speed detecting means (50) and determines to output a motor control signal ($T_2$, $T_3$, $T_4$) representing the content of said motor drive signal (Va) to be fed to said electric motor (14); and motor drive means (40) which receives said motor control signal ($T_2$, $T_3$, $T_4$) and outputs said motor drive signal (Va) to said electric motor (14) in accordance with said motor control signal ($T_2$, $T_3$, $T_4$);

said first determining means (109, 110) and said second determining means (113) comprise a program (100 to 134) for said microcomputer unit (30); and said microcomputer unit (30) determines said frictional load component (D(F)), said road surface side load component (D(L)), and said vehicle speed factor (K(V)) in an address designation manner, in dependence on said output signals ($S_1$, $S_2$, $S_5$) from said detecting means (32, 50), in accordance with said program (100 to 134).

3. An electric power steering system for vehicles according to claim 2, wherein:

said motor drive signal (Va) to be fed from said motor drive means (40) to said electric motor (14) is an armature voltage signal (Va);

said motor drive means (40) comprises a drive circuit (40) for impressing said armature voltage signal (Va) as a PWM signal to said electric motor (14); and said microcomputer unit (30) outputs to said drive circuit (40) said motor control signal ($T_2$, $T_3$, $T_4$) having as a component thereof the sum of said frictional load component (D(F)) and said corrected road surface side component (D'(L)).

4. An electric power steering system for vehicles according to claim 1, wherein:

said drive control means (30, 40) comprises:

a control circuit (30) which receives said output signal ($S_1$, $S_2$) from said steering torque detecting means (32) and said output signal ($S_5$) from said vehicle speed detecting means (50) and determines to output a motor control signal ($T_2$, $T_3$, $T_4$) representing the content of said motor drive signal (Va) to be fed to said electric motor (14); and a motor drive circuit (40) which receives said motor control signal ($T_2$, $T_3$, $T_4$) and outputs said motor drive signal (Va) to said electric motor (14) in accordance with said motor control signal ($T_2$, $T_3$, $T_4$); and said control circuit (30) determines said frictional load component (D(F)), said road surface side load component (D(L)), and said vehicle speed factor (K(V)) in dependence on said output signals ($S_1$, $S_2$, $S_5$) from said detecting means (32, 50).

5. An electric power steering system for vehicles according to claim 4, wherein:

said motor drive signal (Va) to be fed from said motor drive circuit (40) to said electric motor (14) is an armature voltage signal (Va);

said motor drive circuit (40) impresses said armature voltage signal (Va) as a PWM signal to said electric motor (14); and said control circuit (30) outputs to said motor drive circuit (40) said motor control signal ($T_2$, $T_3$, $T_4$)

having as a component thereof the sum of said frictional load component (D(F)) and said corrected road surface side load component (D'(L)).

6. An electric power steering system for vehicles according to claim 1, wherein:
said first determining means (109, 110) determines said frictional load component (D(F)) such that said frictional load component (D(F)) is held at a constant value ($k_1$) while said steering torque (Ts) is larger than a predetermined value (Ta); and
said constant value ($k_1$) has a magnitude required for said electric motor (14) to produce torque corresponding to the load due to said friction elements of said electromagnetic servo device (1).

7. An electric power steering system for vehicles according to claim 1, wherein:
said vehicle speed factor (K(V)) is so determined as to progressively decrease from a predetermined value ($k_2$) as the vehicle speed (V) gradually increases from zero and become zero in a high vehicle speed range ($V_4 \leq V$) in which the vehicle speed (V) is in excess of a first predetermined vehicle speed ($V_4$) of which the value is relatively large.

8. An electric power steering system for vehicles according to claim 1, wherein:
said system (60) further comprises steering speed detecting means (36) for detecting the steering speed (Ns) of said steering wheel;
said drive control means (30, 40) further comprises third determining means (125) for determining a component (D(K·Nm)) of said motor drive signal (Va) that corresponds to the steering speed (Ns), depending on an output signal ($S_3$, $S_4$) from said steering speed detecting means (36); and
said adding and outputting means (115, 128, 40) further adds said steering speed component (D(K·Nm)) to the result (D(Ts)) of the addition of said frictional load component (D(F)) and said corrected road surface side load component (D'(L)) to determine the magnitude of said motor drive signal (Va) and outputs said motor drive signal (Va) to said electric motor (14).

9. An electric power steering system for vehicles according to claim 1, further comprising:
a reduction gear (15) for transmitting torque produced by said electric motor (14) to said output shaft (6), while reducing the speed.

10. An electric power steering system for vehicles according to claim 1, wherein:
said first determining means (109, 110) comprises:
fourth determining means (109) for determining said frictional load component (D(F)) in dependence on said output signal ($S_1$, $S_2$) from said steering torque detecting means (32); and
fifth determining means (110) for determining said road surface side load component (D(L)) in dependence on said output signal ($S_1$, $S_2$) from said steering torque detecting means (32).

* * * * *